United States Patent
Miyazawa et al.

(10) Patent No.: US 7,423,782 B2
(45) Date of Patent: Sep. 9, 2008

(54) IMAGE OUTPUT METHOD, IMAGE OUTPUT DEVICE, AND RECORDING MEDIUM FOR RECORDING PROGRAM USED FOR IMAGE OUTPUT DEVICE

(75) Inventors: Shunsaku Miyazawa, Nagano (JP); Yasuhiro Oshima, Nagao-ken (JP)

(73) Assignee: Seiko Epson Corporation, Tokyo (JP)

( * ) Notice: Subject to any disclaimer, the term of this patent is extended or adjusted under 35 U.S.C. 154(b) by 730 days.

(21) Appl. No.: 10/811,489

(22) Filed: Mar. 29, 2004

(65) Prior Publication Data
US 2005/0036172 A1 Feb. 17, 2005

(30) Foreign Application Priority Data
Mar. 27, 2003 (JP) ............... 2003-089109

(51) Int. Cl.
*G06K 15/00* (2006.01)
*H04N 1/40* (2006.01)

(52) U.S. Cl. .............. 358/2.1; 358/1.6; 358/1.9
(58) Field of Classification Search ........ 358/2.1, 358/1.13–1.15; 347/3
See application file for complete search history.

(56) References Cited
U.S. PATENT DOCUMENTS

| | | | | |
|---|---|---|---|---|
| 6,515,762 B2 * | 2/2003 | Noguchi | ................. | 358/1.9 |
| 6,525,831 B1 * | 2/2003 | Evans, IV | ................. | 358/1.15 |
| 7,014,374 B2 * | 3/2006 | Hamaguchi et al. | ........... | 400/62 |
| 2001/0022003 A1 * | 9/2001 | Narushima | ................. | 725/133 |
| 2001/0045966 A1 * | 11/2001 | Inoue et al. | ................. | 347/3 |
| 2002/0054344 A1 | 5/2002 | Tateyama | ................. | 358/1.15 |
| 2002/0171857 A1 * | 11/2002 | Hisatomi et al. | ........... | 358/1.13 |

FOREIGN PATENT DOCUMENTS

JP 6-110626 A 4/1994
JP 2002091726 * 12/2000

* cited by examiner

*Primary Examiner*—Twyler L. Haskins
*Assistant Examiner*—Dennis Dicker
(74) *Attorney, Agent, or Firm*—Sughrue Mion, PLLC (57) ABSTRACT

An image output device of the invention includes an XHTML analyzer module 22 that analyzes each input XHTML file and generates RGB data, a conversion unit 30 that converts the RGB data into CMYK print data, and a print execution module 34 that transfers the print data to a print head to execute printing. The image output device receives input of an object image from any of a digital television set 50, a digital camera 52, and a personal computer 54 and acquires data representing the format of the input object image. The image output device identifies the format of the input object image based on the acquired data and assigns an adequate one for the identified format among the XHTML analyzer module 22, the conversion unit 30, and the print execution module 34 to process the input object image. This arrangement assigns the processing of the input object image, based on the identified format (type) of the input object image, and thus enables the input object image to be processed efficiently for printing.

11 Claims, 8 Drawing Sheets

```
<?xml version="1.0" encoding="UTF-8">
<!DOCTYPE html PUBLIC "-//PWG//DTD XHTML-Print 1.0//EN"
        "http://www.xhtml-print.org/xhtml-print/xhtml-print10.dtd" >
<html xmlns="http://www.w3.org/1999/xhtml">
<head>
<title>sample</title>
<style type="text/css">
        .pagebreak { page-break-after : always ;}
        @page{
                size:auto;
                margin : 0%;
                counter-increment : pages ;
        @top{
                font-family : "MS Gothic","MS Ming";
                font-size : 100%;
                font-weght : bolder ;
                text-align : left ;
                content : "sample";
        }
        @bottom{
                font-family : "MS Gothic","MS Ming";
                font-size : 80%;
                font-weght : normal ;
                text-align : center ;
                content : "Page " counter(pages) ;
        }
        }

.box15 {
                height : 75px ;
                width : 700px ;
                background-color : skyblue;
                padding:0;
        }
```

Fig. 4

```
        .table13{
                font-size : 80%;
                width : 38% ;
                padding-left: 10px
        }
        .table14{
                font-size : 80%;
                width : 62% ;
        }

.image01{
                width : 100px;
                height : 90px;
        }
        .center{
                text-align:center;
        }
        .indent{
                margin-left:20px;
        }
</style>
</head>
<body>
<div class="box1">
sample                  X, Y, 2003 (Sat)
</div>
<div class="box15">
<table>
  <tr>
    <td class="table13" style="padding: 0px 0px 0px 3px;">
      <img src="buridaikon.jpg" width="90" height="80"/>
    </td>
    <td class="table14"><One-Point Advice><br/>Salt the yellowtail early for removal of its characteristic smell</td>
  </tr>
</table>
</div>
</body>

</html>
```

```
[HEADER]
HdRevision=0x.xx              ; Revision of Script Language
HdAuthor="ABC"                ; Name of Author
HdTitle="New Year' s Card"    ; Title of File
HdDirection=Horizontal        ; Layout Orientation
HdPhysicalPaperSize=A4        ; Output Paper Size
HdMargines=42,42,42,42        ;Settings of Top, Bottom, Left, and Right Margins of Output
Paper

[PAGE]
DrawPicture_TV(".¥ABC1¥ImageA1.jpg",xa1,ya1,xa2,ya2,0)   ; Specify Full-Color Image Drawing
DrawPicture_TV(".¥ABC1¥ImageA2.jpg",xb1,yb1,xb2,yb2,0)   ; Specify Full-Color Image Drawing
```

Fig. 8

IMAGE OUTPUT METHOD, IMAGE OUTPUT DEVICE, AND RECORDING MEDIUM FOR RECORDING PROGRAM USED FOR IMAGE OUTPUT DEVICE

BACKGROUND OF THE INVENTION

1. Field of the Invention

The present invention relates to an image output method, an image output device, and a program used for the image output device.

2. Description of the Prior Art

A proposed image output device receives image data from a computer via a communication interface, such as a USB (Universal Serial Bus) interface, converts the input image data into print data, and executes printing (see Japanese Patent Laid-Open Gazette No. 06-110626).

SUMMARY OF THE INVENTION

Construction of a direct print system that establishes direct connection of a printing device with diverse image input devices other than the personal computer (for example, a digital still camera, an image scanner, and a digital television set) via communication interfaces has highly been demanded to print images input not via the personal computer but directly from any of such image input devices. Some direct print systems have been proposed to directly connect a digital still camera with a printer via a USB interface cable for printing. This direct print system enables even the user who does not possess a personal computer or the user who is unskilled at operations of the personal computer to readily print images taken with a digital still camera. The prerequisite for construction of a direct print system to establish direct connection of a printing device with multiple different image input devices for printing is adequate processing of multiple different types of images input from these multiple different image input devices. The printing device generally has a relatively low processing power, so that efficient image processing is also essential.

An image output method of the invention, a corresponding image output device, and a storage medium for storing a program used for the image output device thus aim to eliminate the drawbacks of the prior art technique and to enable multiple different types of images to be output through an efficient series of processing. The image output method of the invention, the corresponding image output device, and the storage medium for storing the program used for the image output device also aim to enable multiple different types of images to be output through a simpler series of processing.

In order to attain at least part of the above aims, an image output method, an image output device, and a storage medium which stores a program for the image output device are constructed as follows.

The present invention is directed to an image output method adopted in an image output device that is equipped with an output processing module, the output processing module having multi-stage processing units with a preset processing sequence and activating at least a last-stage processing unit among the multi-stage processing units to set image data to output data and to implement output of an image, the image output method including the steps of: (a) receiving image data; (b) identifying type of the received image data; and (c) assigning a specific-stage processing unit adequate for the identified type of the received image data, among the multi-stage processing units, to process the received image data.

The image output method of the invention is adopted in the image output device, which is equipped with the output processing module. The output processing module has the multi-stage processing units with the preset processing sequence and activates at least the last-stage processing unit among the multi-stage processing units to set image data to output data and to implement output of an image. The image output method receives image data, identifies the type of the received image data, and assigns the specific-stage processing unit adequate for the identified type of the received image data, among the multi-stage processing units, to process the received image data. Assignment of the input image data to the specific-stage processing unit adequate for the identified type of the input image data enables the specific-stage and subsequent processing units to execute output of an image. This arrangement efficiently processes multiple different types of image data and thus ensures efficient output of processed images. The image output device may be a printing device, such as an inkjet printer.

In one preferable embodiment of the image output method of the invention, the output processing module includes a color conversion processing unit, as one of the multi-stage processing units, which carries out a series of processing including a conversion process of converting a predetermined color system of the received image data into a color system for output and outputs resulting processed image data to a subsequent-stage processing unit. When the type of the received image data identified in the step (b) shows that the received image data has the predetermined color system, the step (c) assigns the color conversion processing unit to process the received image data. In this embodiment, the predetermined color system may be RGB color system, and the color system for output may be CMY color system. In this embodiment, further, the color conversion processing unit may be actualized by an exclusive hardware structure. In one preferable application of the above embodiment, the output processing module may include an extension processing unit that makes compressed image data in a predetermined format subjected to a preset series of extension processing and outputs resulting extended image data to the color conversion processing unit. When the type of the received image data identified in the step (b) shows that the received image data is compressed image data in the predetermined format, the step (c) assigns the extension processing unit to process the received image data.

In one preferable embodiment of the image output method of the present invention, the output processing module includes an analyzer processing unit, as one of the multi-stage processing units, which carries out a series of processing including an analysis process of analyzing a description file described in a selected page description language and outputs resulting processed image data to a subsequent-stage processing unit. When the type of the received image data identified in the step (b) shows that the received image data is a description file described in the selected page description language, the step (c) assigns the analyzer processing unit to process the received image data. In this embodiment, the selected page description language may be a predetermined markup language or a predetermined script language. In one preferable application of the above embodiment, the image output device may be constructed to be connectable via a specific communication interface with a broadcasting receiver device that receives broadcast data sent from a broadcast station. The step (a) receives input of the description file, which is created based on the broadcast data received by the broadcasting receiver device, via the communication interface.

In one preferable embodiment of the image output method of the invention, the output processing module includes, as the last-stage processing unit, an image output execution unit that executes output of an image based on the output data. When the type of the received image data identified in the step (b) shows that the image data is the output data, the step (c) assigns the image output execution unit to process the image data.

In another preferable embodiment of the image output method of the invention, the image output device is constructed to be connectable via a specific communication interface with multiple different image input devices that input image data, and the step (a) receives image data from each of the multiple different image input devices via the communication interface. In one application of this embodiment, the step (b) acquires type data representing the type of the received image data, in response to reception of the image data from one of the multiple different image input devices via the communication interface, and identifies the type of the received image data based on the acquired type data.

The technique of the present invention described above as the image output method is also applicable to an image output device and a storage medium which stores a program for the image output device.

DESCRIPTION OF THE PREFERRED EMBODIMENTS

Figure 1:
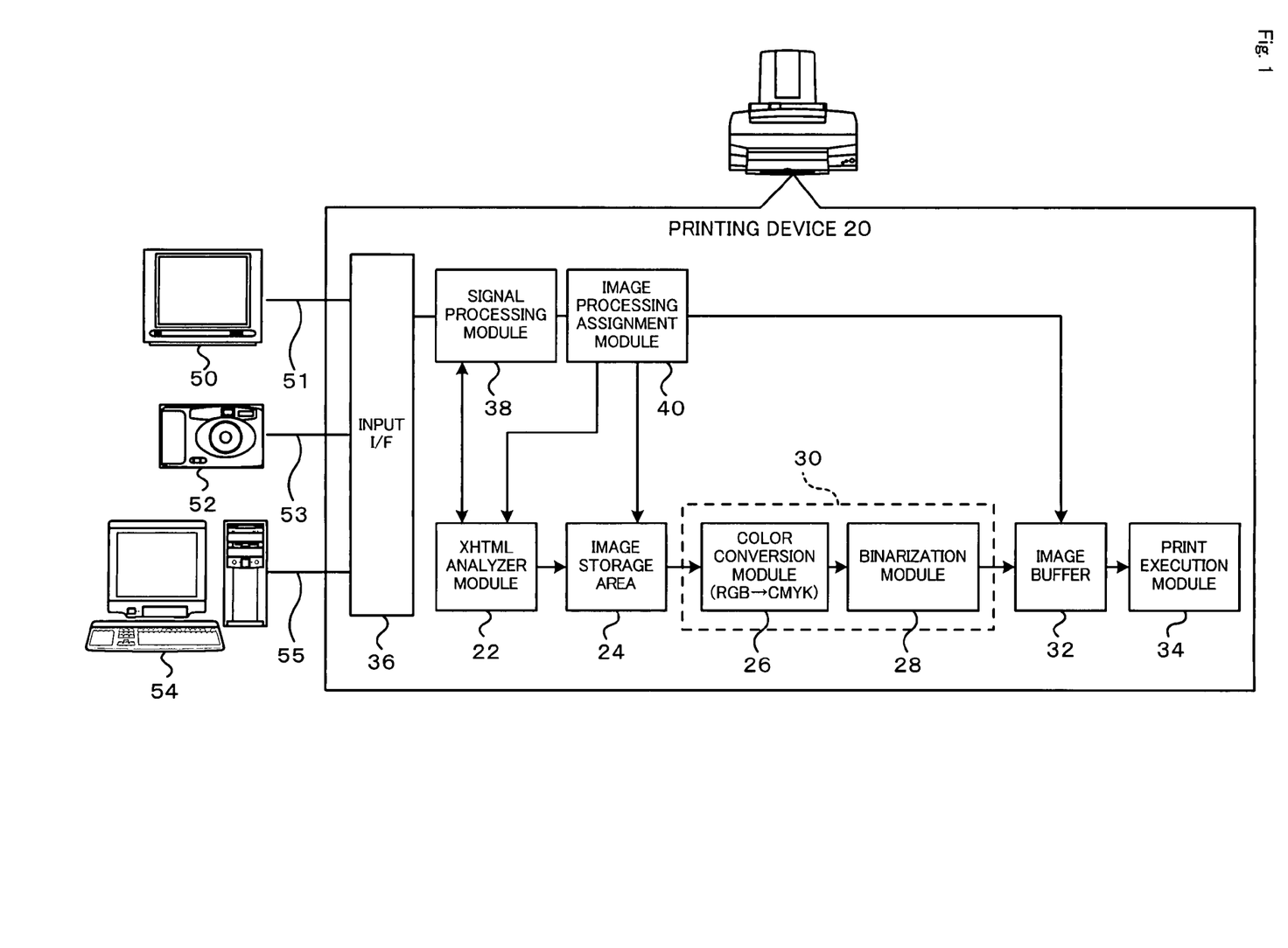
FIG. 1 schematically illustrates the structure of an inkjet printer 20 of the embodiment.

One preferred embodiment of the invention is discussed below. FIG. 1 schematically illustrates the structure of an inkjet printer 20 of the embodiment, which is connectable with a digital television set 50, a digital camera 52, and a personal computer 54. The printer 20 of the embodiment is constructed as a multiprinter that receives input of digital image files in diverse formats (for example, XHTML: extensible Hyper Text Markup Language), object files accompanied with the digital image files, data in a R (red) G (green) B (blue) color system (hereafter referred to as RGB data), and data in a C (cyan) M (magenta) Y (yellow) K (black) color system (hereafter referred to as CMYK data) from the digital television set 50, the digital camera 52, and the personal computer 54 and prints images on printing paper.

As shown in FIG. 1, the printer 20 of the embodiment includes an XHTML analyzer module 22 that analyzes each XHTML file and generates RGB data, an image storage area 24 that is defined as a memory area for storage of the RGB data, a conversion unit 30 that converts the RGB data into print data printable by the printer 20, and an image buffer 32 that temporarily stores the print data in units of bands of a print head. The printer 20 also includes a print execution module 34 that executes printing according to the print data stored in units of bands in the image buffer 32, an input interface 36 that is connected with the digital television set 50, the digital camera 52, and the personal computer 54 via communication interfaces 51, 53, and 55 (for example, IEEE 1394 interface cables or USB interface cables) to input images, a signal processing module 38 that identifies the format (type) of each input image and makes each input image subjected to a preset series of processing, and an image processing assignment module 40 that assigns one of the HTML analyzer module 22, the conversion unit 30, and the print execution module 34 for data processing, based on the identified form of the input image. The operations of the signal processing module 38 and the assignment for data processing by the image processing assignment module 40 will be discussed later in detail.

The XHTML analyzer module 22 analyzes each XHTML file input from the digital television set 50 via the input interface 36, the signal processing module 38, and the image processing assignment module 40, while generating RGB data in the unit corresponding to the capacity of the image storage area 24 and storing the generated RGB data into the image storage area 24. The analysis of the XHTML file analyzes tags described in the XHTML file. The printer 20 may input and analyze a file written in another markup language, instead of the XHTML file.

Figure 2:
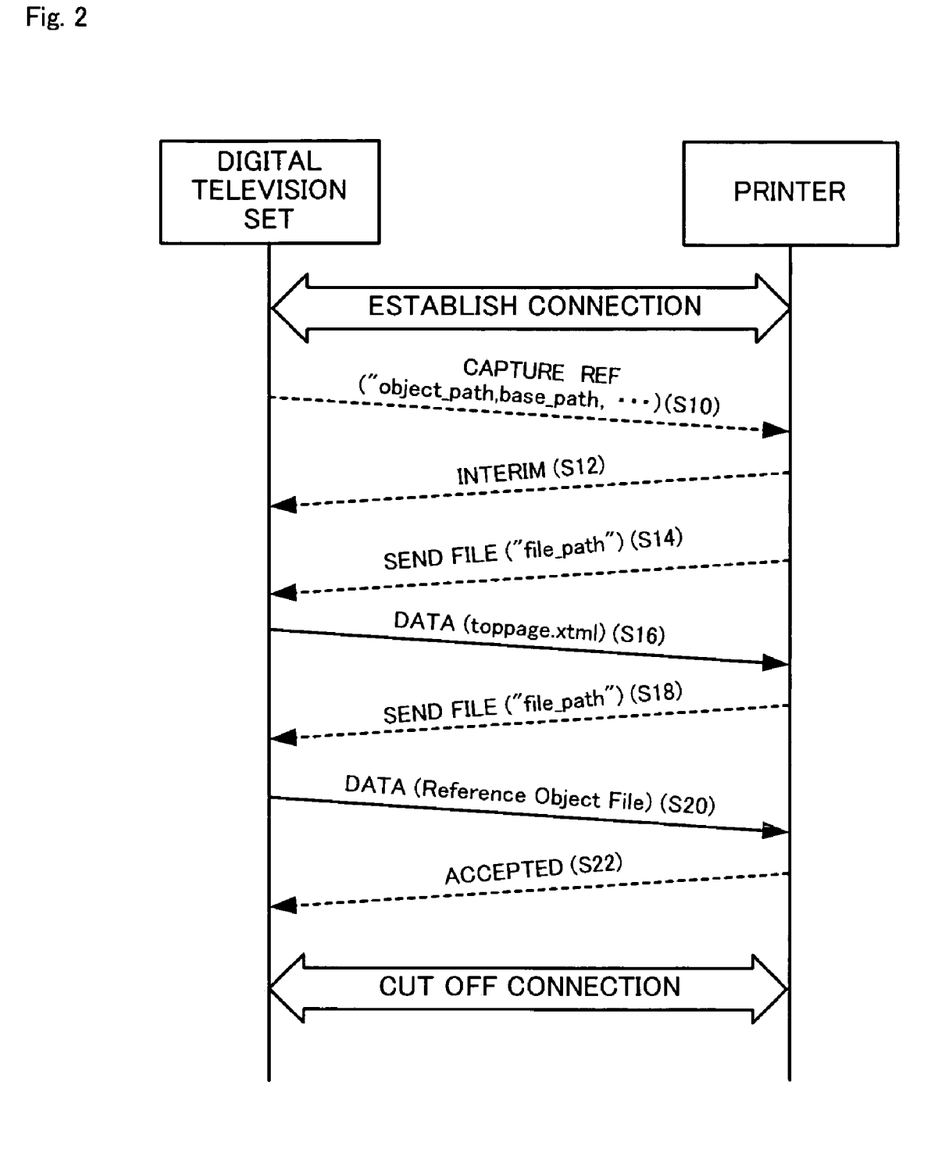
FIG. 2 is a sequence diagram showing a communication process between the printer 20 and a digital television set 50 of the embodiment.
Figure 3:
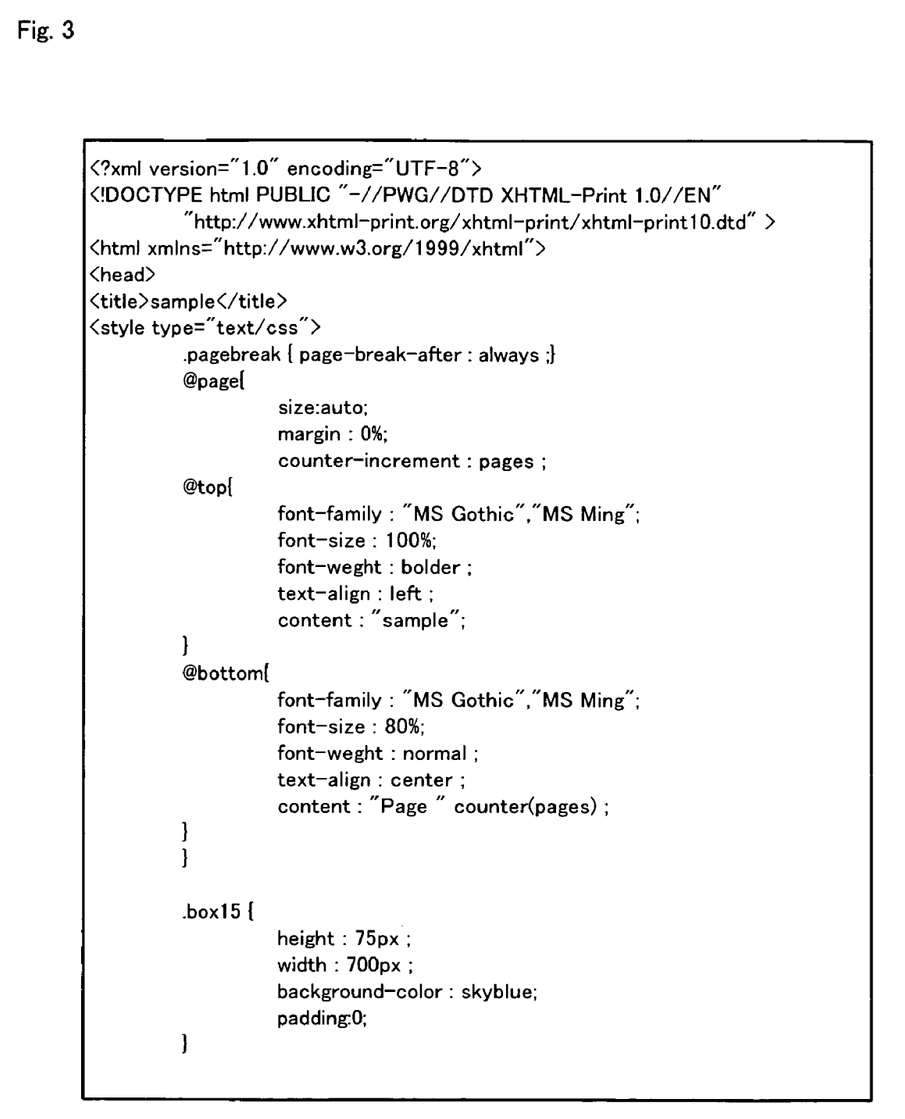
FIG. 3 shows an example of the first half of an XHTML file.
Figure 4:
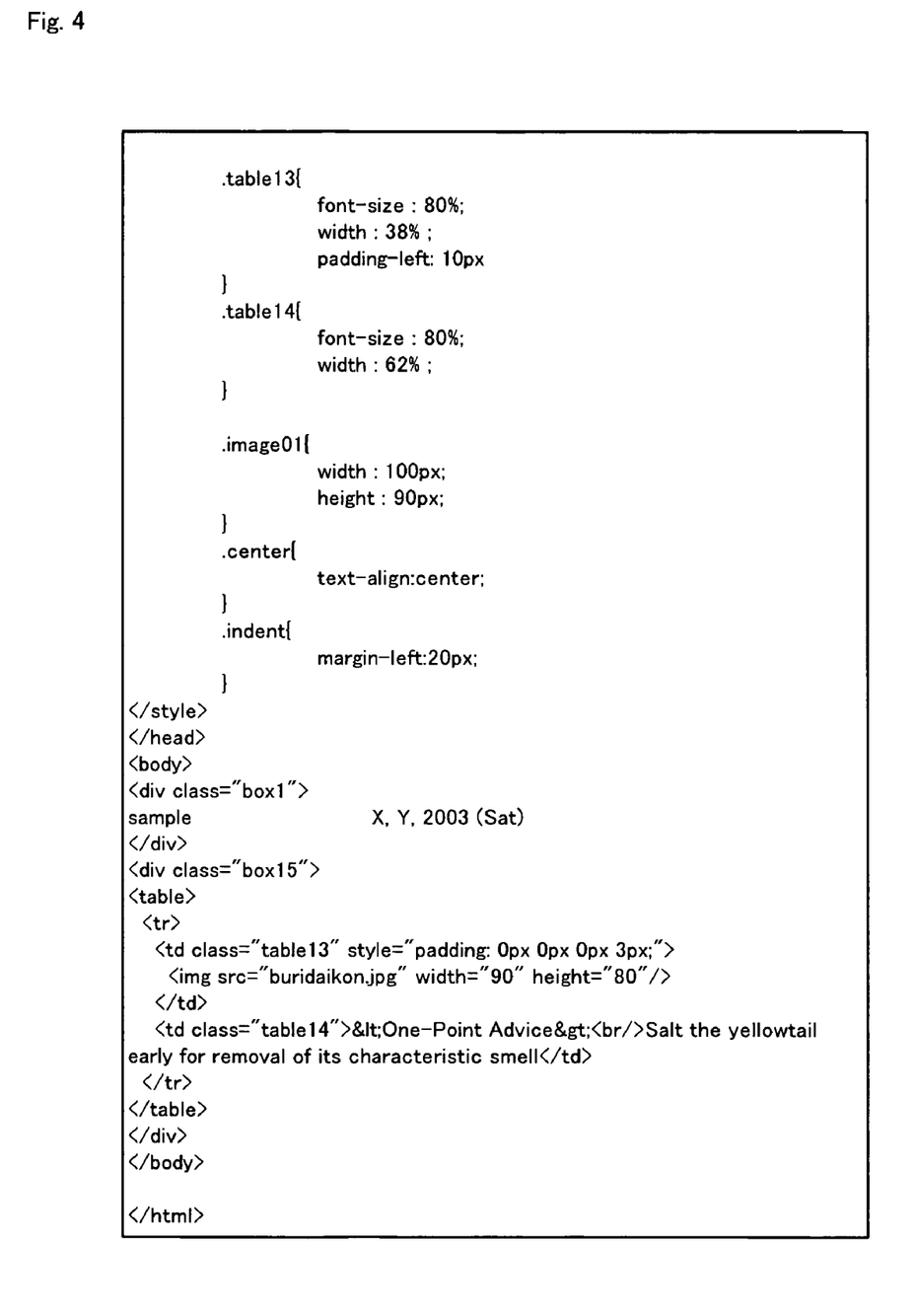
FIG. 4 shows an example of the second half of the XHTML file.
Figure 5:
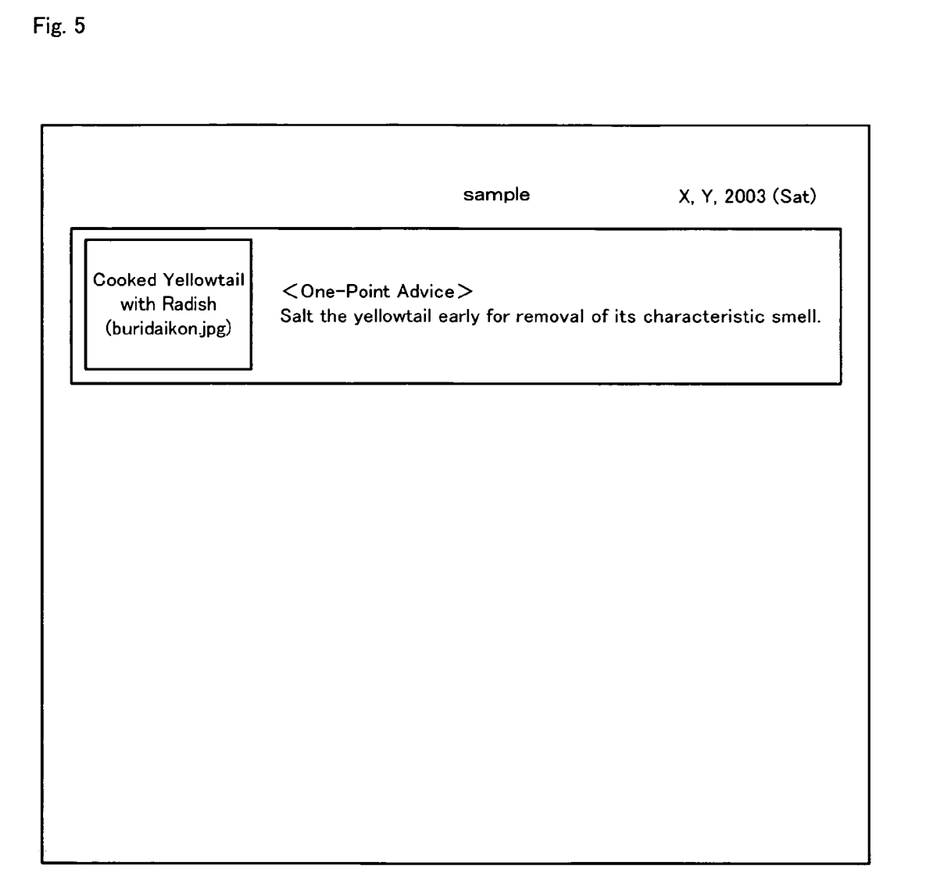
FIG. 5 shows a resulting image displayed by analyzing the XHTML file.

FIG. 2 is a sequence diagram showing a sequence of processing executed by the printer 20 of the embodiment to establish communication with the digital television set 50 via the communication interface (for example, IEEE 1394), receive input of an XHTML file in communication, and analyze the input XHTML file. In response to a print instruction of printing a currently displayed screen page on the digital television set 50 through manipulation of, for example, a non-illustrated remote control, the digital television set 50 sends a command 'CAPTURE REF ("object_path, base_path, . . . ")' to the printer 20 (S10), as shown in the sequence diagram of FIG. 2. This command causes the printer 20 of the embodiment to transmit connection-relating information to and from the digital television set 50, to establish connection with the digital television set 50 via respective plugs, and to receive an image print instruction. The connection-relating information includes information regarding the format of an image (an XHTML file in this illustrated example) sent from the digital television set 50. Here "object_path, base_path" represents the file name and the path name of the file to be printed. In response to reception of the command 'CAPTURE REF', the printer 20 of the embodiment sends a command 'INTERIM' to require a standby (S12). The printer 20 sets "object_path, base_path" of the received command 'CAPTURE REF' to "file_path" and sends a command 'SEND FILE("file_path")' to the digital television set 50 to demand files required for printing (S14). The printer 20 then receives an XHTML file 'DATA (toppage.xhtml)' from the digital television set 50 (S16). The printer 20 of the embodiment analyzes tags included in the received XHTML file and, in response to the setting of each object file to be referred to (for example, c:/*/buridaikon.jpg) in the analyzed tags, sends a command 'SEND FILE ("file_path")' (for example, SEND FILE ("c:/*/***.jpg") with the file name and the path name of the object file (S18). The printer 20 then receives a reference object file 'DATA' from the digital television set 50 (S20). On completion of receiving all reference object files specified by the tags, the printer 20 of the embodiment sends a code 'ACCEPTED' representing completed reception of all the required files for printing, as a response to the command 'CAPTURE REF', to the digital television set 50 (S22). In response to reception of the code 'ACCEPTED', the digital television set 50 cuts the connection off to terminate the sequence of processing. FIGS. 3 and 4 show an example of a top page described in XHTML, and FIG. 5 shows a resulting image displayed by analyzing the top page.

The conversion unit 30 includes a color conversion module 26 that carries out color conversion to convert the RGB data stored in the image storage area 24 into CMYK data and a binarization unit 28 that binarizes the CMYK data through error diffusion or another equivalent image processing. This conversion unit 30 is actualized by an exclusive hardware structure to attain the high-speed data processing.

The signal processing module 38 receives input of an XHTML file and object files accompanied with the XHTML file, RGB data, or CMYK data from any of the digital television set 50, the digital camera 52, and the personal computer 54 via the input interface 36, identifies the format of the input data, and outputs the input data to the image processing assignment module 40. When the input data is a file compressed by a compression technique like JPEG, the signal processing module 38 carries out a preset extension process and outputs resulting extended data. The signal processing module 38 obtains information on the format of the input data from the digital television set 50, the digital camera 52, or the personal computer 54, when the printer 20 of the embodiment establishes communication with the digital television set 50, the digital camera 52, or the personal computer 54.

Figure 6:
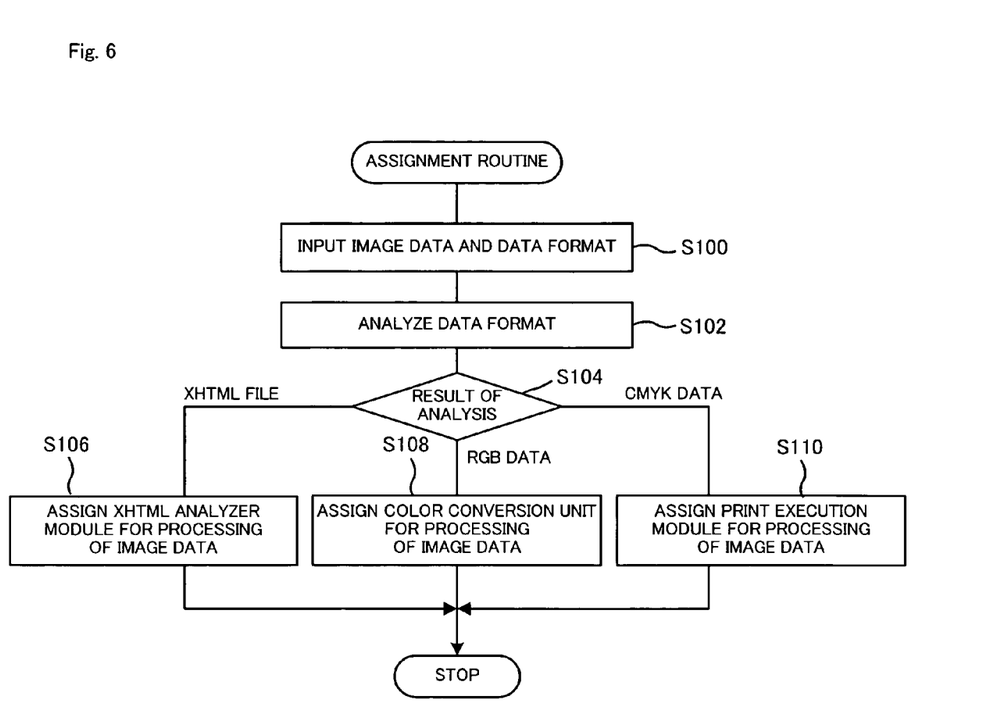
FIG. 6 is a flowchart showing an assignment routine.

FIG. 6 is a flowchart showing an assignment routine, which is executed by the signal processing module 38 and the image processing assignment module 40 in the printer 20 of the embodiment. This assignment routine is activated, in response to input of a signal from any of the digital television set 50, the digital camera 52, and the personal computer 54 to the signal processing module 38 via the input interface 36.

When the assignment routine of FIG. 6 starts, the signal processing module 38 inputs image data with its data format via the input interface 36 (step S100), analyzes the data format of the input image data (step S102), and identifies the format of the input image data, based on the result of the analysis (step S104). The concrete procedure of this embodiment determines whether the image data input via the input interface 36 is an XHTML file, RGB data, or CMYK data.

When the input image data is identified as an XHTML file, the assignment routine assigns the XHTML analyzer module 22 for the processing of the image data input at step S100 and outputs the input image data to the XHTML analyzer module 22 (step S106), before being terminated. The XHTML analyzer module 22 assigned for the processing of the XHTML file analyzes the tags included in the XHTML file, generates RGB data based on the result of the analysis, and stores the generated RGB data into the image storage area 24. The RGB data stored in the image storage area 24 is converted into print data by the conversion unit 30, is stored into the image buffer 32, and is printed by the print execution module 34.

When the input image data is identified as RGB data, the assignment routine assigns the conversion unit 30 for the processing of the input image data and stores the input image data into the image storage area 24 (step S108), before being terminated. The RGB data stored in the image storage area 24 is converted into print data by the conversion unit 30, is stored into the image buffer 32, and is printed by the print execution module 34.

When the input image data is identified as CMYK data that is directly printable by the print execution module 34, the assignment routine directly assigns the print execution module 34 for the processing of the input image data and successively stores the input image data in units of bands of the print head into the image buffer 32 (step S110), before being terminated. The print data stored in the image buffer 32 is sequentially transferred to the print head of the print execution module 34 to be printed.

As described above, the printer 20 of the embodiment assigns an adequate-stage processing unit among the three-stage processing units, that is, the XHTML analyzer module 22, the conversion unit 30, and the print execution module 34, for the processing of input image data, based on the format (type) of the input image data from one of the digital television set 50, the digital camera 52, and the personal computer 54. The printer 20 of the embodiment is thus directly connectable with multiple different devices including the digital television set 50, the digital camera 52, and the personal computer 54 to efficiently implement printing.

The XHTML analyzer module 22, the image storage area 24, the conversion unit 30, the image buffer 32, and the print execution module 34 in the printer 20 of the embodiment correspond to the output processing module of the invention. The input interface 36, the signal processing module 36, and the image processing assignment module 40 are respectively equivalent to the image data receiving module, the image data type identification module, and the processing assignment module of the invention.

Figure 7:
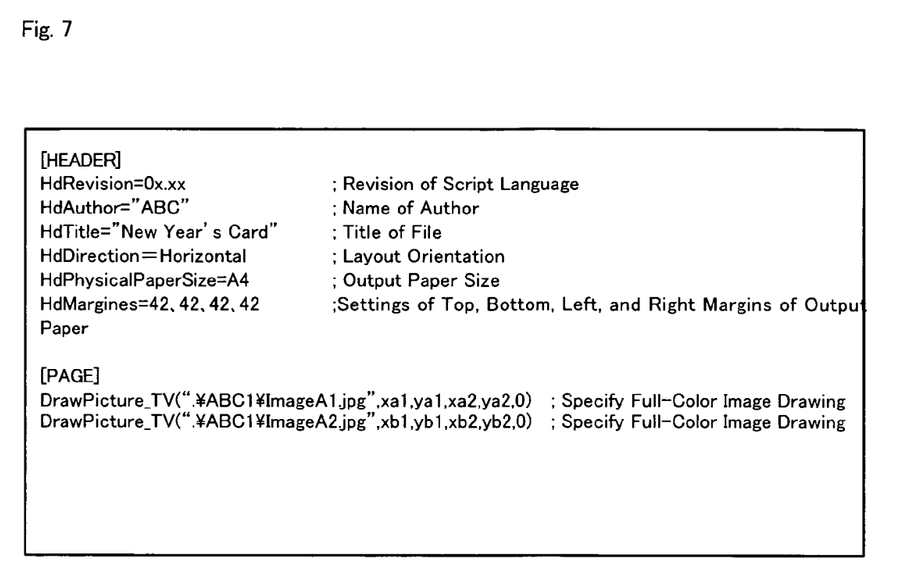
FIG. 7 shows one example of a script.
Figure 8:
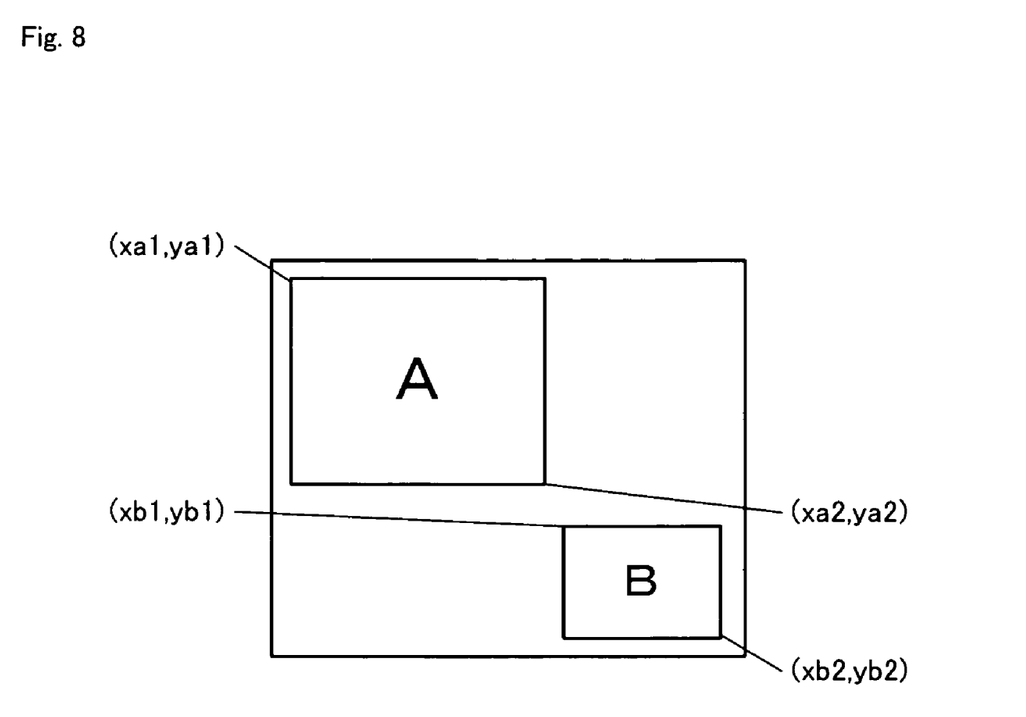
FIG. 8 shows image data corresponding to the script.

In the printer 20 of the embodiment, in response to input of a file described in a markup language, for example, an XHTML file as shown in FIGS. 3 through 5, via the input interface 36, the XHTML analyzer 22 analyzes the tags included in the input XHTML file, generates RGB data, and stores the generated RGB data into the image storage area 24. In response to input of a script described in a script language from the digital camera 52 via the input interface 36, the XHTML analyzer module 22 may function to analyze the input script, generate RGB data, and store the generated RGB data into the image storage area 24. FIG. 7 shows one example of a script and FIG. 8 shows image data corresponding to the script. In the illustrated example of FIG. 7, the revision of the script language, the name of the author, the title of the file, the layout orientation, the output paper size, and settings of the top, bottom, left, and right margins of the output paper are described in a [HEADER] section, whereas specification of images is described in a [PAGE] section. The script 'Draw-Picture_TV' specifies each image by various variables including the name of an image file including the path name, the x coordinate at an upper left corner of an image area, the x coordinate at a lower right corner of the image area, the y coordinate at the upper left corner of the image area, the y coordinate at the lower right corner of the image area, and rotation of the image. In this illustrated example, numerals '0', '1', '2', '3', and '4' respectively represent no rotation, clockwise rotation by 90 degrees, clockwise rotation by 180 degrees, clockwise rotation by 270 degrees, and auto rotation.

The printer 20 of the embodiment is designed to accept XHTML files, RGB data, and CMYK data for printing. The printer may be modified to accept only RGB data and CMYK data or to accept only XHTML files and RGB data. The XHTML analyzer module 22 is omitted from the structure of the printer, when XHTML files are unacceptable.

In the printer 20 of the embodiment, the conversion unit 30 including the color conversion module 26 and the binarization module 28 is actualized by an integral exclusive hardware structure. These modules may be constructed separately.

In the printer 20 of the embodiment, in response to input of a file compressed by a compression technique like JPEG from a recording medium (for example, a memory card like a flash memory) via the input interface 36, the signal processing module 38 carries out a preset extension process to generate RGB data and outputs the generated RGB data to the image processing assignment module 40. In one possible modification, the signal processing module 38 does not take charge of the extension process, but an extension processing module (not shown) is provided separately. There are accordingly two routes in the printer of this modified structure; the route from the image processing assignment module 40 via the extension processing module to the image storage area 24 and the route from the image processing assignment module 40 directly to the image storage area 24. When receiving a compressed file from the signal processing module 38, the image processing assignment module 40 assigns the input compressed file to the extension processing module. When receiving non-compressed RGB data, on the other hand, the image processing assignment module 40 directly stores the input RGB data into the image storage area 24.

The above embodiment regards the printer 20. The technique of the invention is, however, not restricted to the printer but may be actualized by an image output device that is capable of outputting images, as well as by a corresponding image output method. Another application of the invention is a storage medium for storing a program that causes a single or multiple computers to function as the image output device. In this application, the program is installed from the storage medium into a memory device of the computer and is executed appropriately.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An image output method adopted in an image output device that is equipped with an output processing module, said output processing module having multi-stage processing units with a preset processing sequence and activating at least a last-stage processing unit among the multi-stage processing units to set image data to output data and to implement output of an image, the multi-stage processing units including: a color conversion processing unit which carries out a series of processing including a conversion process of converting RGB color system of image data into a CMY color system and outputs resulting processed image data toward an image butter adjacent to the last-stage processing unit; and an XHTML analyzer processing unit which carries out a series of processing including an analysis process of analyzing a description file described in a predetermined markup language or a predetermined script language and outputs resulting processed image data toward the color conversion processing unit, said image output method comprising the steps of:
(a) receiving image data;
(b) identifying type of the received image data; and
(c) in case the type of the received image data is the description file, assigning the XHTML analyzer processing unit to process the received image data, and in case the type of the received image data is in a CMY color system, assigning the image buffer directly to process the received image data without subjecting the image data to the processing by the color conversion processing unit.

2. An image output method in accordance with claim 1, wherein the color conversion processing unit is actualized by an exclusive hardware structure.

3. An image output method in accordance with claim 1, wherein said output processing module comprises an extension processing unit that makes compressed image data in a predetermined format subjected to a preset series of extension processing and outputs resulting extended image data to the color conversion processing unit, and when the type of the received image data identified in said step (b) shows that the received image data is compressed image data in the predetermined format, said step (c) assigns the extension processing unit to process the received image data.

4. An image output method in accordance with claim 1, wherein said image output device is constructed to be connectable via a specific communication interface with a broadcasting receiver device that receives broadcast data sent from a broadcast station, and said step (a) receives input of the description file, which is created based on the broadcast data received by said broadcasting receiver device, via the communication interface.

5. An image output method in accordance with claim 1, wherein said output processing module comprises, as the last-stage processing unit, an image output execution unit that executes output of an image based on the output data, and when the type of the received image data identified in said step (b) shows that the image data is the output data, said step (c) assigns the image output execution unit to process the image data.

6. An image output method in accordance with claim 1, wherein said image output device is constructed to be connectable via a specific communication interface with multiple different image input devices that input image data, and said step (a) receives image data from each of the multiple different image input devices via the communication interface.

7. An image output method in accordance with claim 6, wherein said step (b) acquires type data representing the type of the received image data, in response to reception of the image data from one of said multiple different image input devices via the communication interface, and identifies the type of the received image data based on the acquired type data.

8. An image output method in accordance with claim 1, wherein said image output device is a printing device.

9. An image output method in accordance with claim 8, wherein the printing device is an inkjet printer.

10. An image output device that outputs an image, said image output device comprising:

an output processing module that has multi-stage processing units with a preset processing sequence and activates at least a last-stage processing unit among the multi-stage processing units to set image data to output data in an allowable form by said image output device and to implement output of an image, wherein the multi-stage processing units include a color conversion processing unit which carries out a series of processing including a conversion process of converting a RGB color system of image data into a CMY color system and outputs resulting processed image data toward an image buffer adjacent to the last-stage processing unit;

and an XHTML analyzer processing unit which carries out a series of processing including an analysis process of analyzing a description file described in a predetermined markup language or a predetermined script language and outputs resulting processed image data toward the color conversion processing unit;

an image data receiving module that receives image data;

an image data type identification module that identifies a type of the received image data; and a processing assignment module that assigns the XHTML analyzer processing unit to process the received image data in case the type of the received image data is the description file, and assigns the image buffer directly to process the received image data without subjecting the image data to processing by the color conversion processing unit in case the type of the received image data is data in the CMY color system.

11. A computer readable storage medium storing therein a computer program which causes a computer to function as an image output device in accordance with claim 10.

* * * * *